United States Patent [19]

Matsuda

[11] Patent Number: 4,714,618
[45] Date of Patent: Dec. 22, 1987

[54] PROCESS FOR TREATING FROZEN BLOCK MEAT

[75] Inventor: Eiichi Matsuda, Kagawa, Japan

[73] Assignee: Fine Foods Research Cooperative Union, Kagawa, Japan

[21] Appl. No.: 37,664

[22] Filed: Apr. 13, 1987

[30] Foreign Application Priority Data

May 17, 1986 [JP]  Japan ................................ 61-113191

[51] Int. Cl.⁴ ............................ A23B 4/06; A23L 3/36
[52] U.S. Cl. .................................... 426/524; 426/393; 426/506
[58] Field of Search ............... 426/506, 518, 520, 524, 426/393; 99/470

[56] References Cited

U.S. PATENT DOCUMENTS 4,361,016 11/1982 Multack ............................ 426/524
4,504,498 3/1985 Kissam ............................. 426/524

*Primary Examiner*—George Yeung
*Attorney, Agent, or Firm*—Armstrong, Nikaido, Marmelstein & Kubovcik

[57] ABSTRACT

A process for treating frozen block meat, which includes the steps of: defrosting the frozen block meat by subjecting same to a temperature of between $-4°$ C. and $0°$ C.; cutting the defrosted block meat into pieces of a thickness of about 30 mm or less; heating the cut meat by contact with hot water of $80°-100°$ C. for 30-90 seconds; then immediately cooling the heated meat by contact with cold water of $5°$ C. or below for 1-30 seconds; removing the water deposits on the surface of the cooled meat; and freezing the resulting meat.

6 Claims, 1 Drawing Figure

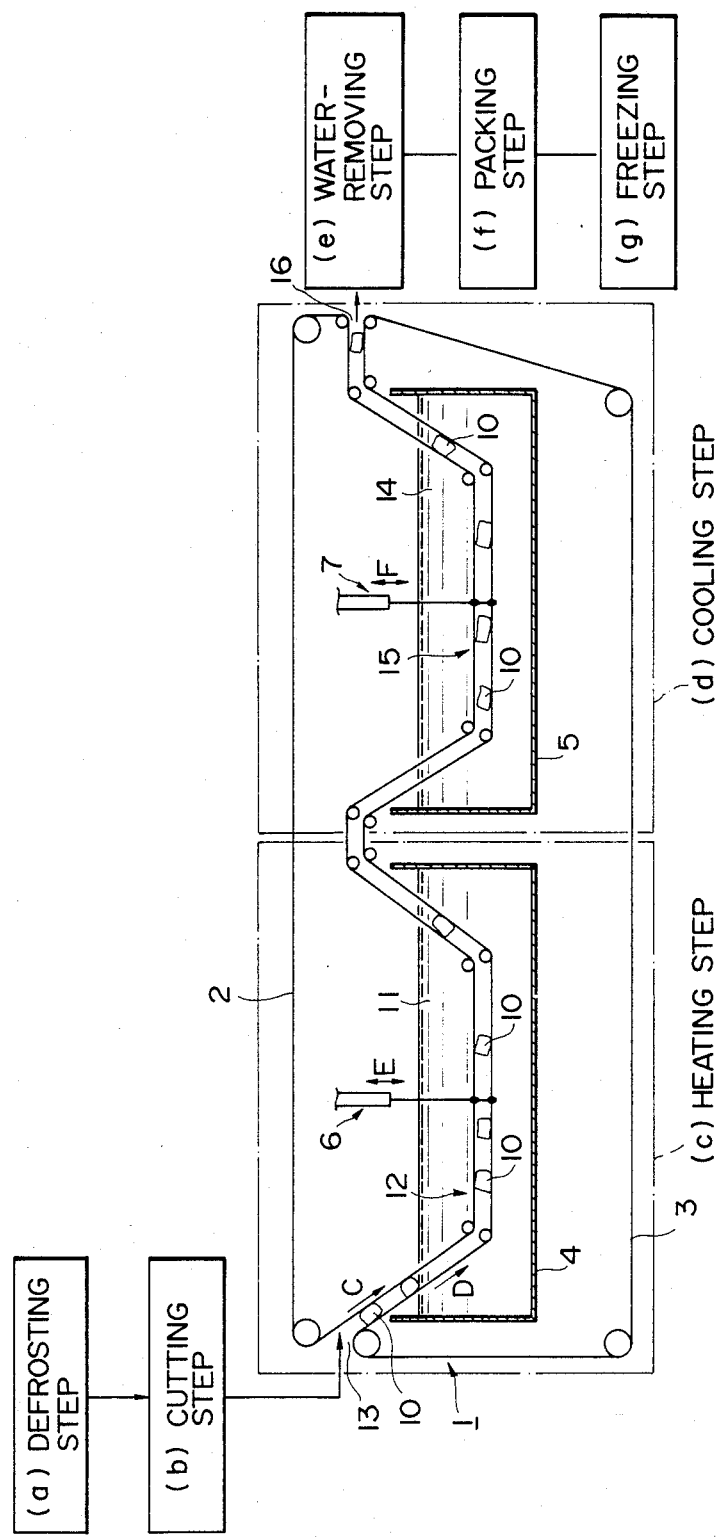

PROCESS FOR TREATING FROZEN BLOCK MEAT

This invention relates to a process for treating frozen block meat so as to be ready to cook.

In large restaurants or companies for making a large number of meals such as lunch at one time, frozen block meat with each block weighing from about 10 to 30 kg is frequently used in order to reduce cost and store for a long period of time. In instances where such frozen meat is employed, the treatment of the block meat is required because, if it is cooked without treatment after cut into small pieces, taste may be sometimes impaired because of exudation of a large amount of scum-forming ingredients such as hemoglobin, mioglobin and miogen and because of offensive smells left. That is, large restaurants and meal-making companies treat such frozen block meat by defrosting a planned daily amount of the block meat, immersing the defrosted block meat in a large quantity of hot water to remove such ingredients and then cut the defrosted block meat into shapes suitable for use.

However, there are the following disadvantages in the treatment of frozen block meat conventionally employed.

(1) In large restaurants, the treatment of frozen block meat is usually made as a part of preparation of materials and must be carried out under bad working conditions such as before dawn or early morning.

(2) As block meat of a large piece is heated in hot water, a long period of time is required for causing heat to reach its inner portion. A long period of time is also required for cooling such warmed meat.

(3) As block meat is employed, the meat quality between the surface portion and the inner portion is unlikely to be uniform because the conductivity of heat therebetween during the heating in hot water is not identical. That is, the surface portion is ready to be cooked whereas the inner portion requires a long time period for being cooked.

(4) As block meat is likely to be deformed during the heating in hot water and as it is cut in accordance with usage after the heating (the meat becomes breakable due to the coagulation of proteins), waste meat pieces are likely to occur at the time of cutting.

(5) Scum-forming ingredients in block meat and undesirable attachment such as fat cannot be removed to an adequate level merely by heating frozen block meat in hot water so that taste is considerably impaired when compared to raw meat.

The present invention is made in consideration of various problems that arise when frozen block meat is employed and has the object to provide a process for treating frozen block meat which overcomes a variety of problems in connection with a restriction in working periods of time for treating frozen block meat, a time required for treating frozen block meat, a lack of uniformity in the meat quality, and occurrence of waste meat pieces and which improves tastes. The present invention is applicable to any meat such as beeves, porks, horsefleshes, chikens, muttons or venisons.

In accordance with the present invention there is provided a process for treating frozen block meat, comprising the steps of:

subjecting the frozen block meat to an environment maintained at a temperature of between $-4°$ C. and $0°$ C. for defrosting the frozen block meat;

cutting the defrosted block meat into pieces of a thickness of about 30 mm or less;

heating the cut meat with steam or hot water having a temperature of $80°-100°$ C. for a period of 30–90 seconds;

then cooling the heated cut meat in cold water having a temperature of $5°$ C. or below for a period of 1–30 seconds; and then freezing the cooled cut meat after removing the water which was used in the cooling step and which deposits on the surface of the cooled cut meat.

The process for treating frozen block meat in accordance with the present invention has the effects:

(1) that the heating period of time is shortened because frozen block meat is cut into desired shapes after having been defrosted to a desired unfrozen state and then cut pieces are heated in hot water, and the meat quality of each cut piece after the heating becomes uniform, and (2) that the fat portion which got soft on the surface portion of the meat by the heating is coagulated by the immediate cooling so that it is likely to be removed from the meat portion into water because the small meat pieces are caused to be cooled immediately after the heating while they are still hot, and this may also promote the removal of scum-forming ingredients.

The present invention will now be described in more detail with reference to the accompanying drawings, in which:

the sole FIGURE is a flow diagram schematically showing a series of treatment steps of a process according to the present invention.

The example illustrated in the FIGURE includes the steps of: (a) defrosting a large block of frozen meat to a desired unfrozen state; (b) cutting the unfrozen block meat into small pieces of given sizes in accordance with later usage; (c) heating the cut meat pieces by immersing them in hot water; (d) cooling the hot meat pirces in cold water immediately after the heating step; (e) removing the water deposits from the surfaces of cold meat pieces; (f) packing the meat pieces after measuring their weights; and (g) freezing the packs for reservation. Each of the steps (a) through (g) will be described in detail below.

(a) Defrosting Step:

A large block of frozen meat generally weighing from 10–50 kg is first placed in a chamber maintained at a temperature between $-4°$ C. and $0°$ C. to defrost same to any desired degree. Although the defrosting step may cause the frozen block meat to be completely defrosted, it is preferred that the defrosting step defrost the frozen block meat by about half in view of the easiness of cutting the meat in the succeeding step. Preferereably, the defrosting step is continued until the temperature of the block meat at its middle portion becomes from $-3°$ C. to $-2°$ C.

(b) Cutting Step:

The defrosted block meat obtained in the previous step (a) is cut in slices or blocks having a thickness of about 30 mm or less by means of a conventional cutter device. The size of the cut meat is determined according to the final usage. The cutting step is rendered easy and the shape-keeping of cut meat becomes favorable when half-defrosted meat block is used.

(c) Heating Step:

The cut meat obtained in step (b) is then heated with hot water having a temperature of $80°-100°$ C. for a period of time of 30–90 seconds. The heating may be effected by immersing the cut meat into the hot water or by contacting the meat with the running hot water. Steam may also be used for heating the cut meat.

In the specific example shown in the FIGURE, the heat treatment of the cut meat is effected by means of an immersion-type apparatus. Designated generally as 1 is a conveyor device for transferring the cut meat 10 along a predetermined path through a heating zone and a succeeding cooling zone. The conveyor device 1 has upper and lower belts 2 and 3 each formed of an endless net and running in the directions shown by the arrows C and D, respectively. The upper and lower belts 2 and 3 are constructed so as to be moved forward while holding the cut meat pieces 10 therebetween. The belt conveyor device 1 has a portion, generally designated as 12, arranged so as to pass through the inside of a heating tank 4 containing hot water 11. The portion 12 of the belt conveyor device 1 passing within the heating tank 4 is arranged so as to be immersed into the approximate half of depth of the hot water 11. Means 6 such as an expansion cylinder is provided for vibrating up and down (in the direction shown by the double arrow E) the belt conveyor 1 travelling in the middle portion of the tank 4.

The moving speed of the belt conveyor device 1 is adjusted so as to immerse each cut meat 10 into the hot water 11 for a period of time of 30-90 seconds. Suitable immersing time varies with the kind and size of the cut meat and the temperature of the hot water 11. The temperature of the hot water 11 is adjusted between 80°-100° C., for example, by supplying fresh hot water or vapor to the tank 4 while discarding a portion of the hot water 11 in the tank 4.

In operation, the cut meat pieces from the cutting step (b) are continuously fed to an inlet portion 13 of the conveyor device 1 and are held by the upper and lower belts 2 and 3 at positions. The meat pieces 10 are then transferred through and heated with the hot water 11 in the tank 4. When the meat pieces are heated in the hot water 11, scum-forming ingredients and fat portions are removed from the meat and are caused to float on the surface of the hot water 11. The up-and-down vibration of the upper and lower belts 2 and 3 caused by the vibrating means 6 can also acclerate the removal of the scum-forming ingredients and fat portions from the meat. As described above, the heating of cut meat pieces in hot water after block meat was cut into pieces increases the surface areas of the cut meat pieces to be exposed to the hot water, thereby enabling to remove scum-forming ingredients and fat portions for a shorter time period. The cut meat pieces thus heated are then discharged from the heating tank 4 and transferred to a juxtaposed cooling tank 5.

(d) Cooling Step:

The conveying device 1 in this embodiment also has a portion 15 positioned within the cooling tank 5 containing cooling water 14 and is arranged to transfer the heated meat pieces 10 from the heating step (c) through the cooling water 14 maintained at a temperature of 5° C. or below. The upper and lower belts 2 and 3 are also shaked in the direction shown by the double arrow F by a vibrating means 7. In the cooling step, the hot cut meat pieces from the heating step (c) are immersed in cold water 14 for 1-30 seconds for rapid cooling therewith. By the rapid cooling of the still hot meat pieces by immersion into the cooling water 14, the meat pieces that were swelled in the previous step coagulate so that the scum-forming ingredients and fat portions on the meat pieces may be readily removed. Furthermore, the vibration of the meat pieces by the action of vibrating means 7 may accelerate the removal of these undesirable deposits. The meat pieces are then taken out from the cold water 14 and discharged from an outlet 16 of the conveyor device 1. The cooling of the heated meat can also be made by contact with running cold water.

(e) Water Removing Step:

The wet, cooled meat pieces from the step (d) are treated for the removal of the water adhering to the surfaces thereof by any suitable means such as by wiping, blowing of dry air or the like.

(f) Packing Step:

The meat pieces from the surfaces of which the water has been removed are then packed with a suitable film by any conventional packaging means. The weight of each meat pieces is to be measured before packing.

(g) Freezing Step:

The packed meat pieces from the step (f) are then frozen for transportion and storage.

The following example will further illustrate the present invention.

EXAMPLE

The meat pieces obtained by the process according to the present invention are compared with those obtained by conventional procedures in which frozen block meat is defrosted, heated and cut at the time of cooking. The results are shown in Table 1 below. Taste examination is carried out in a functional examination method by 15 persons.

TABLE 1

| Items | Inventive Method | Conventional Method |
|---|---|---|
| Removal of fats | 92% | 80% |
| Removal of scums | 95% | 78% |
| Taste | Very good | Good |
| Occurrence of waste meat | 4% | 9% |

Removal percentages of fat portions and scums were calculated by collecting those floating on the heating and cooling liquids. As apparent from the above results, the process of the present invention is superior in removal percentages of fats and scums, taste and occurrence of waste meat in comparison with the conventional method.

The process for the treatment of frozen block meat in accordance with the present invention has the following advantages:

(1) As frozen block meat is heated in hot water after having been defrosted to a given unfrozen state and cut into small pieces of given shapes in accordance with uses, time periods for heating and cooling can be shortened and the meat quality of the small meat pieces become uniform after the heating and a quantity of waste meat portion can be reduced. It is also to be noted that, since block meat is heated after cut into small pieces of given shapes, the surface areas of the meat pieces are increased, thereby enabling to increase a rate of removing attachment such as fats and scums as compared to conventional method in which block meat is heated without cut.

(2) As small meat pieces are cooled rapidly in cold water when it is still hot immediately after it was heated, fats that were softened on the surface portions of the meat pieces are caused to coagulate so that it becomes likely to be separated from the meat portions and the separation of scums is accelerated, thereby leading to better taste (and, in particular, smells peculiar to frozen meat can be removed).

(3) As the small meat pieces are stored in a predetermined manner (for example, in packs) after the water was removed from the small pieces that had been heated in hot water and then cooled in cold water, they can be used only in the quantity necessary for cooking and then cooked immediately. It is thus to be noted that the process for the treatment of frozen block meat in accordance with the present invention can eliminate a restriction on a time period for preparation and enable the cooking any time in a day. It is thus unnecessary to allow the time period for preparation to be during busy and less comfortable time periods (such as before dawn or very early morning).

I claim:

1. A process for treating frozen block meat, comprising the steps of:
    subjecting the frozen block meat to an environment maintained at a temperature of between $-4°$ C. and $0°$ C. for defrosting the frozen block meat;
    cutting the defrosted block meat into pieces of a thickness of about 30 mm or less;
    heating the cut meat with steam or hot water having a temperature of $80°-100°$ C. for a period of 30-90 seconds;
    then cooling the heated cut meat in cold water having a temperature of $5°$ C. or below for a period of 1-30 seconds; and
    then freezing the cooled cut meat after removing the cold water which deposits on the surface of the cooled cut meat.

2. A process as claimed in claim 1, wherein the defrosting of the frozen block meat is continued until the temperature of the frozen block meat at its middle portion becomes $-2°$ to $-3°$ C.

3. A process as claimed in claim 1, wherein said heating is by immersing the cut meat into the hot water.

4. A process as claimed in claim 1, wherein said cooling is by immersing the cut meat into the cold water.

5. A process as claimed in claim 1, wherein the cooled cut meat after removing the water is packed into a film package prior to said freezing.

6. A process as claimed in claim 1, wherein the frozen block meat has a temperature of about $-18°$ C. or below.

* * * * *